United States Patent

Pilat

[15] 3,693,457

[45] Sept. 26, 1972

[54] SOURCE TEST CASCADE IMPACTOR

[72] Inventor: Michael J. Pilat, Seattle, Wash.

[73] Assignee: The Battelle Development Corporation, Columbus, Ohio

[22] Filed: Feb. 24, 1971

[21] Appl. No.: 118,408

[52] U.S. Cl. .................................73/432 PS, 73/28
[51] Int. Cl. ............................................G01n 15/02
[58] Field of Search...........73/432 PS, 28; 209/139 R

[56] References Cited

UNITED STATES PATENTS

| | | |
|---|---|---|
| 3,001,914 | 9/1961 | Andersen....................73/28 X |
| 3,127,763 | 4/1964 | Lippmann ......................73/28 |

FOREIGN PATENTS OR APPLICATIONS

| | | |
|---|---|---|
| 1,170,047 | 11/1969 | Great Britain.................73/28 |
| 128,199 | 1/1959 | U.S.S.R....................73/432 PS |

OTHER PUBLICATIONS

Mercer, T. T., A Cascade Impactor Operating at Low Volumetric Flow Rates, in Lovelace Foundation Report, p. 1– 19, Dec. 1962.

Primary Examiner—Louis R. Prince
Assistant Examiner—Joseph W. Roskos
Attorney—Christensen & Sanborn

[57] ABSTRACT

A cascade impactor for measuring the quantity and size distribution of suspended particles in stacks, ducts and other pollution sources is described. The impactor which is adapted to be placed within the duct carrying the particle-laden fluids comprises a tubular body containing a plurality of serially spaced-apart impactor plates interspaced between serially spaced-apart jet stages, each succeeding jet stage having a smaller gas flow cross section than the preceding jet stage. A sized portion of the particulate matter suspended in gases flowing through the cascade impactor is captured by collection surfaces on the impactor plate placed below the specific jet stage which imparts a sufficient amount of inertia to the particle for it to impinge upon the collection surface. Dry collection surfaces are used for liquid aerosols whereas collection surfaces covered with a sticky substance such as grease are utilized for dry particulate matter. The size distribution of the particulate matter is reflected by the amounts of particulate matter adhering to the various impactor plates.

4 Claims, 3 Drawing Figures

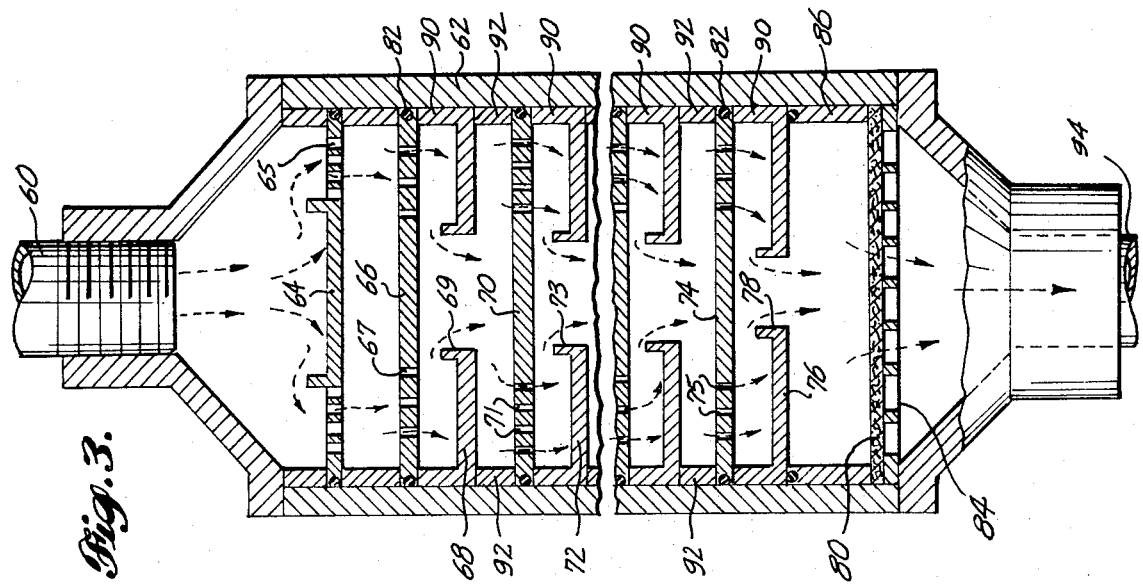
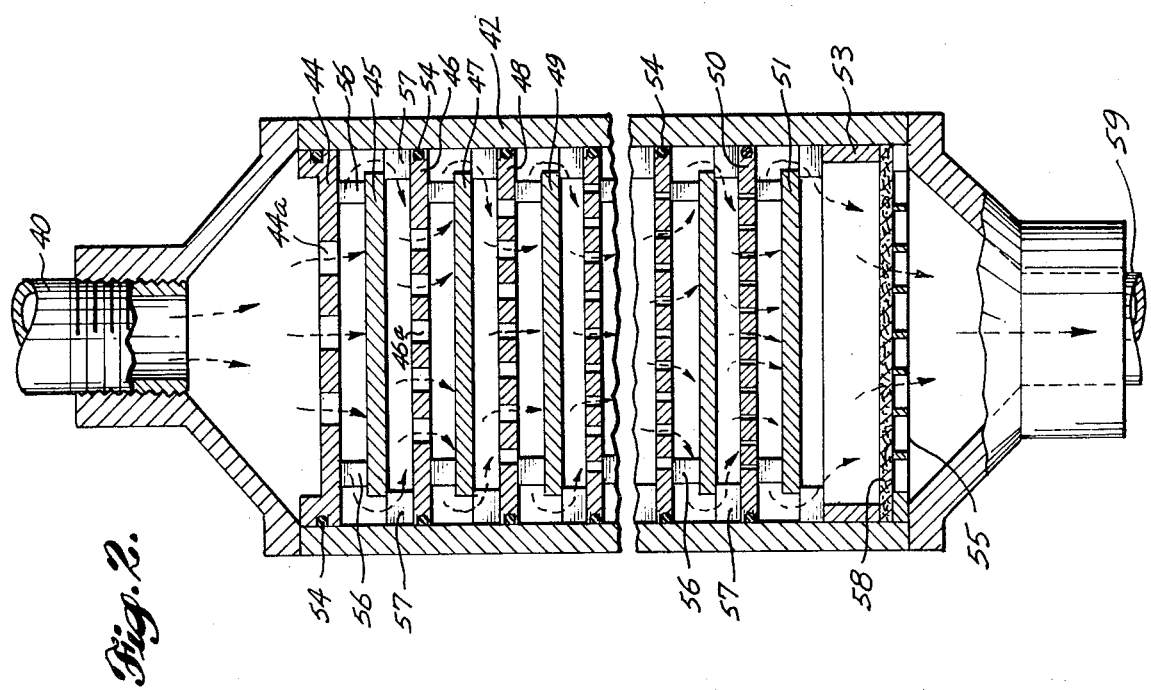

//3,693,457

SOURCE TEST CASCADE IMPACTOR

BACKGROUND OF THE INVENTION

This invention relates to a method for and means of sampling the particulate matter content of fluid suspensions and in particular gaseous systems carrying suspended particulate matter flowing within the confines of a duct or the like.

This invention further relates to an impaction type of sampling device by which a particle size distribution may be determined for a particulate-laden gaseous stream.

The invention described herein was made in the course of work under a grant or award from the Department of Health, Education and Welfare.

Information on the quantities and size distributions of aerosols and other particulates in ducts and stacks is of use for aerosol inhalation studies, designing particulate collection equipment, characterizing the aerosol emissions from air pollutant sources and other purposes. To obtain a useful sample of and information about a gaseous stream containing suspended particulates, it is necessary to use a sampling method which has substantially isokinetic sampling capabilities, and which minimizes wall losses and water vapor condensation. The method must provide a representative sample of the gases and the apparatus used must have structural ruggedness, low cost, and ease of use to enable widespread usage in industry.

Numerous prior art devices are known which utilize a multiple or single jet stage with a collection plate located downstream from the jet stage. Heretofore the impingement devices have suffered from severe problems of losses of particles to the walls and other locations as well as inefficiencies of various types to the extent that substantially unusable information is obtained from the quantity of particles which impinge upon and are collected by the collection plates in such devices. The wall losses and other associated problems have largely been due to the failure of the prior art devices to provide a proper gas flow path for the particle-laden gases after impingement upon the individual impingement stages. To prevent collection of particles on the walls and other surfaces, the flow path must have a sufficient cross-sectional area so that the gas velocities do not cause the particles to impinge upon the walls or other surfaces of the collector. The design of prior art devices have frequently resulted in collection of one half or more of the particulate matter in areas other than the impingement plate of the device. Data gathered from such devices cannot reflect the true particle size distribution.

Other problems which have been associated with the prior art devices and which aggravate the problem of collection of particles on surfaces other than the collection plates include the problems of condensation of liquids and failure of such devices to obtain a truly representative sampling of the particle-laden gases.

OBJECTS OF THE INVENTION

It is therefore an object of this invention to provide a source test cascade impactor which removes all or nearly all of the particulate matter suspended in a gas and classifies the particulate matter into a size distribution.

It is a further object of this invention to provide a cascade impactor which may be suspended within the duct carrying the gas being sampled so that problems of condensation and thermal collection of particles are minimized or eliminated.

An additional object of this invention is to provide apparatus and method for removing a representative particle-laden gaseous sample from a gaseous media and separate the particulate matter suspended therein into a particle size distribution employing a multiple stage cascade type impactor which has a plurality of gas-accelerating jets in each stage and which has an increasing gas velocity and decreasing gas flow cross section serially in each stage along the direction of flow and which has a decreasing absolute gas pressure from the impactor inlet to the impactor outlet.

A further additional object of this invention is to provide a cascade impactor in which all or nearly all of the particles collected by impaction are collected upon the impactor plates rather than upon the side walls or other areas of the device.

One important object of this invention is to provide a cascade impactor capable of handling substantial pressure drops across the individual stages thereof without gas leakage around the stages and in which the absolute gas pressure and gas flow at the final jet stage may be monitored to permit accurate calculation of the dimensions of particles collected on the various impactor stages.

One specific object of this invention is to provide a multiple stage cascade type impactor for evaluation of particulate matter suspended in a flowing gaseous stream which provides an adequate gas flow cross-sectional area for flow of particle-laden gases between the individual stages to substantially eliminate impingement of the particulate matter on areas of the apparatus other than those areas intended for particle collection.

Another specific object of this invention is to provide a cascade impactor having a plurality of particle collection surfaces and a filter means to collect all particles not removed by impingement upon the particle collection surfaces.

SUMMARY OF THE INVENTION

The source test cascade impactor of this invention comprises a substantially tubular body having a plurality of jet impingement stages with particle collection plates positioned beneath the jet impingement stages contained within the interior of the tubular body. The entire body is adapted to be inserted inside duct carrying particulate-laden fluids to be sampled and has an exterior shape which minimizes aerodynamic drag and turbulence within the duct.

The tubular body has removable inlet and outlet sections connected to a first and second end of the body, respectively. The inlet section carries a nozzle means which may be interchanged with other nozzle means to provide the particular nozzle gas flow cross section necessary to achieve isokinetic sampling of the gases.

The tubular body contains a plurality of particle collection stages which each comprise a jet stage element having a plurality of apertures for gas flow positioned ahead of a corresponding impactor plate toward which the particle-laden gases are caused to flow from the apertures. Each of the jet stage elements has a sealing means positioned between the outer periphery thereof and the interior wall of the tubular body. The impactor plates are constructed so that a gas flow cross section substantially larger than the total gas flow cross section of the jet stages is afforded to the gas flowing past the impactor plates. This is accomplished by either having an unimpeded peripheral flow around the outer edges of the impactor plates or by having the central portion of each impactor plate removed for gas flow through the center thereof. In the latter embodiment, the impactor plates take a substantially annular shape and the jet stage has the apertures therein arranged in a manner so that the gases passing therethrough will impinge upon the outer ring portion which forms the collection surface of the substantially annular impactor plate.

The gas flow cross section provided through each jet stage serially diminishes along the direction of flow of the fluid so that each stage imparts a higher velocity to the particle-laden fluid passing therethrough than was experienced in the immediately preceding stage. At each stage particles which attain a sufficient inertia to strike the collection surface of the impactor plate are captured and the smaller, lighter particles pass on to the next stage.

After passage of a quantity of gases through the impactor, the impactor is removed from the gas flow stream, dismantled and the quantity of particulate matter collected upon each stage determined. Empirical or theoretical analysis may then be utilized to determine the particulate size distribution. The analysis includes the calculation at the 50 percent particle collection efficiencies of each jet stage using the particle weight per collection plate, the gas temperature, gas absolute pressure, the gas volumetric flow made through the impactor, the number of jets per stage and the diameter of the jet stages.

These and other objects, advantages and attributes of this invention may be more readily ascertained by an evaluation of the following description of the preferred embodiments with reference to the attached drawings.

IN THE DRAWINGS:

FIG. 2 shows a cross-sectional view of one embodiment of the sampling device of this invention.

FIG. 3 shows a cross-sectional view of a second embodiment of this invention.

Figure 1:
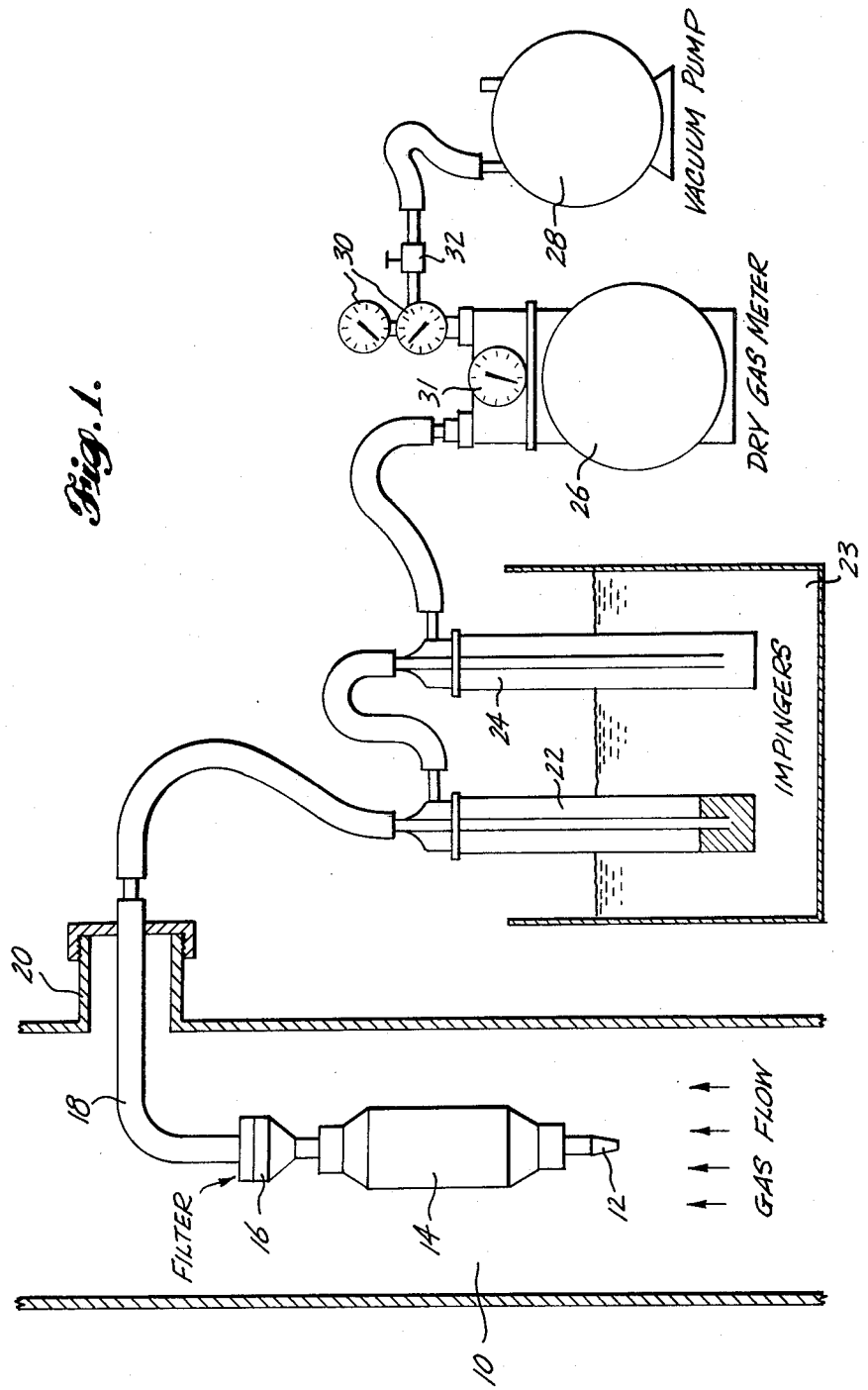
FIG. 1 shows a schematic diagram of a typical gas sampling train utilizing the invention disclosed herein.

Referring more particularly to the drawings, there is seen in FIG. 1 a train having the cascade type impactor suspended within a duct 10 having a gas flow as shown. The cascade impactor has a nozzle 12, a cylindrical body 14 and a filter 16, all of which are suspended within the interior of the duct 10. By controlling the flow rate of gases through the impactor, isokinetic conditions can be obtained. In addition, the presence of the impactor within the interior of the duct substantially eliminates the problems of condensation of vaporous materials contained in the gas stream and the thermal deposition of particles upon colder surfaces of the cascade impactor, since the cascade impactor assumes the same temperature as the gas flowing in the duct 10 after a reasonable exposure time. Tubing 18 attached to the back of filter 16 passes out through the duct opening 20 and to a typical gas train having impingers 22 and 24 positioned if desired within a constant temperature bath 23 and a dry gas meter 26 equipped with temperature and pressure gauges 30, as well as gas flow meter 31 which records the volume of gas flowing through the meter. The flow of gas is controlled by valve 32 at the entrance to vacuum pump 28.

Referring to FIG. 2, a cross-sectional view of a first embodiment of the cascade impactor of the invention is shown. Gas inlet 40 is connected to a nozzle (not shown) for withdrawing gas from a flow within a duct or other location. The tubular body 42 contains a series of particle collection stages comprising a jet stage and an impactor plate arranged with the apertures of the jet stages positioned directly above a collection surface on the impactor plates. Gases passing through the apertures in the jet stages are accelerated to impart sufficient velocity to particles above a certain size so that those particles impact upon and are captured by a collection surface on the impactor plate.

In FIG. 2, a first jet stage 44 is shown positioned above first impactor plate 45 so that large particles entrained in the gas will impact upon the collection surface of impactor plate 45. Jet stage 44 is sealed along the walls of the cylindrical housing 42 by means of an 0 ring seal 54.

Gas flow within the embodiment shown in FIG. 2, as indicated by the dotted arrows and proceeds through the jet apertures 44a, impinges upon the upper surface of the first impactor plate 45 and then flows past the jet spacers 56 and around the edges of impactor plate 45. The impactor plate 45 is supported by plate spacer 57 spaced around the periphery of the impactor plate 45. The jet spacers 56 and plate spacers 57 may be made as an integral part of the jet stages, the impactor plates, or may be in the form of a spider or individual spacer elements. The gas proceeds along the indicated flow path through to the second jet stage 46 and through the apertures 46a thereof, impinging upon the upper surface of impactor plate 47. The smaller diameter of the apertures 46a, as compared with apertures 44a, cause the gas flowing therethrough to achieve a higher velocity so that particles smaller than those impinged upon plate 45 will impinge upon plate 47 and be collected. The gas then flows around the circumference of the impactor plate 47 through jet stage 48 to impactor plate 49 and so on through the apparatus down through the last jet stage 50 to impact upon the last impactor plate 51. The apertures in the last jet stage 50 are quite small and cause relatively tiny particles to impinge upon impactor plate 51. Any remaining particulate matter passes around the outside of impactor plate 51 and is collected by the filter 58 which is held in position by a filter support plate 55 and an annular collar 53. The gas flow then passes out of the cascade impactor and into a typical gas train as shown in FIG. 1. Absolute gas pressure may be measured at the entrance to the gas train to permit theoretical analysis of the cascade impactor operating characteristics.

In FIG. 3, a second embodiment of this invention is shown. The tubular housing 62 has a gas inlet 60 at one end and a gas outlet 94 at the other end. The gas inlet 60 draws particle-laden gases into the interior of the cascade impactor and causes the gas to impinge upon the top impactor tray 64. This impactor tray is designed to remove any very large particulate matter from the gas stream and cause the gas stream to flow out around the periphery of the impactor tray 64 into apertures 65 which act as gas flow straighteners or distributors. An impactor plate may be placed directly beneath this top impactor tray 64; however, for proper gas flow, it is usually desirable to utilize an open space with a first jet stage 66 positioned beneath the impactor tray 64. Apertures 67 in the first jet stage 66 imparts sufficient velocity to the gases that the larger particulate matter suspended therein impacts upon the collection surface of the first impactor plate 68 and is captured thereon. The gas then flows toward the center of the impactor plate 68 and downwardly through the gas flow opening 69 into the next chamber where it encounters the second jet stage 70. The apertures 71 in the second jet stage 70 cause the gas to attain a sufficient velocity that medium sized particles are then impinged upon the collection surface of the second impactor plate 72. Gas flow then proceeds into the center of the second impactor plate 72 and flows downwardly through the gas flow opening 73. Further downward flow of the gases results in the same series of events as described above with the exception that each succeeding jet stage has smaller apertures so that a higher velocity is imparted to the gases flowing through the apertures, causing impingement of successively smaller and smaller particles upon the collection surface of each succeeding impactor plate. The gases ultimately reach the last jet stage 74, pass through its apertures 75 and impinge upon the last impactor plate 76, collecting a portion of the smallest particles remaining in the gases. The gases then travel through gas flow opening 78 and through filter 80 which removes the very small particles remaining in the gaseous stream. Filter 80 is supported by the perforated disc 85 and held in place by spacer 86.

Each jet stage is sealed from the adjacent stage by means of an 0 ring seal 82 and the upright portion 90 on each impactor plate provides the spatial separation necessary for proper operation of the cascade impactor. An annular spacer 92 is positioned between the bottom of each impactor plate and the top of each jet stage to provide the necessary spacing therebetween. The annular spacers may be made as an integral part of the jet stages or the impactor plates, or may be individual elements positioned in the impactor to provide the necessary spacing. The gas outlet 94 is connected to a vacuum source such as a typical gas train for sampling gases.

Use of the invention in either of its embodiments may be carried out by the following series of preparatory and sampling steps. The cascade impactor is thoroughly cleaned by washing with a suitable solvent such as benzene to remove any materials remaining from previous testing. The collection surface of each impactor plate is then coated with a thin layer of a tacky or sticky substance such as grease in the event that solid particulate matter is being sampled. If the particulate matter being sampled comprises liquids or liquid aerosols, no grease will be necessary on the surface of the impactor plates. The impactor plates and the filter in the bottom of the cascade impactor are then individually weighed accurately to determine a tare weight.

The conditions of the gas flowing in the duct is then determined by evaluating the gas velocity profile and measuring the temperature, pressure, humidity and other conditions. Based upon these conditions, a nozzle size is calculated which will provide isokinetic sampling.

It is also usually necessary to find a suitable location for the sampling to take place in which the gas flow is reasonably constant and preferably in the laminar flow regime. It is preferable to have the sampling location approximately 20 diameters' length down the duct from a discontinuity to permit the gas flow in the duct to attain even, uniform conditions if possible. The sampling train composed of the cascade impactor followed by suitable filtration or impinging equipment and a gas dry meter connected to an air pump is set up in preparation for sampling. Water condensation problems may be prevented by preheating the cascade impactor for a sufficient amount of time to permit the impactor to assume a temperature substantially equal to that present on the inside of the duct, or the impactor may be placed directly into the duct and held there long enough to achieve thermal equilibrium before beginning sampling.

The cascade impactor is then placed at the desired location within the duct and a substantially constant gas flow rate established through the impactor. The apparatus is operated for a period of time sufficient to give a suitable sample size for determination of the particle quantity and size distribution within the duct.

The cascade impactor is then removed from the duct and dismantled for evaluation of the captured particles on each impactor plate. The plates are weighed to determine the quality of particulate matter collected by each plate and the filter resulting in an indication of the size distribution of the particles entrained in the gases contained in the duct. The size distribution of particles may be determined microscopically to calibrate the cascade impactor or the theoretical calibration equation suitable for use with this type of apparatus may be utilized. Chemical analysis of the particle size fractions may also be performed.

In one example of the application shown in FIG. 2 which was constructed and tested for its collection efficiency, the following dimensions were utilized. A cylindrical aluminum tube 3 inches in diameter formed the tubular body housing the impactor stages. Each jet stage had a thickness of 0.05 inches so that the axial length of apertures throughout the device were 0.05 inches. The distance separating the bottom surface of the jet stage and the top surface of the impactor plates was 0.1 inch. The number of jets and the jet diameter for each stage is listed below in Table I.

TABLE I

| Stage | Jet Diameter (inches) | Number of Jets |
|---|---|---|
| 1 | 0.120 | 103 |
| 2 | 0.0595 | 102 |
| 3 | 0.0370 | 102 |
| 4 | 0.0280 | 102 |
| 5 | 0.210 | 102 |
| 6 | 0.0135 | 102 |

The cascade impactor described above was used to collect fly ash in boiler stacks, measure the particulate size distribution in the flue from a kraft pulp mill recovery furnace and other test situations. Some problems with loss of a minor amount of the particulate matter to the walls and to the top surface of the first jet stage were encountered. The particle size distribution of suspended particulate matter was easily ascertained by weighing the amount of particulate matter collected on each stage and applying well known theoretical analysis to the impingement collection efficiencies for each plate.

Particle collection observed with models of the cascade impactor described above and that observed by sampling with an Alundum thimble filter were substantially the same if particles on top of the first stage and on the walls were included in the total particles collected.

The embodiment of this invention shown in FIG. 3 substantially eliminates all the wall loss problem and by its construction prevents the accumulation of particulate matter on top of the first jet stage. The centrally located fluid passageway through each impingement plate causes the particle-laden fluid to flow to the center of the device, thus avoiding any contact with the walls.

In considering the invention, it will be understood that the invention is not limited to the particular embodiments described in detail above nor is the cascade impactor of this invention limited to any particular number of stages, to the materials of construction utilized nor to specific structural details. While the cylindrical form for the tubular body is preferred, any suitable shape may be provided which permits easy assembly and disassembly of the cascade impactor. Therefore, in the practice of the invention, numerous changes in the structure materials and configuration may be made without departure from the spirit or scope of the invention as defined in the appended claims.

I claim:

1. A cascade impactor for sampling particle-laden gases for total particulate content and particle size distribution adapted to be placed within the fluid stream being sampled comprising:
   a tubular body having a gas inlet at one end and a gas outlet at the other end, said gas inlet including a nozzle means sized for isokinetic sampling;
   a plurality of particle collection stages positioned within said tubular body, said stages each including a jet stage having a plurality of apertures therethrough cooperating with an impactor plate having a particle collection surface thereon, said surface positioned adjacent the outlet of said apertures, the total cross-sectional area of said apertures in each jet stage diminishing serially in the direction of flow of said fluid;
   a fluid flow path between adjacent particle collection stages permitting relatively unrestrained flow of fluid from the impactor plate of one of said particle collection stages to the upper surface of the immediately subjacent jet stage, said flow path past said impactor stages being a centrally located aperture in each of said plates, and
   spacer means maintaining said jet stages and said impactor plates in a spaced apart relationship along the axis of said tubular member.

2. The apparatus of claim 1 wherein said impactor plates each comprise an annular surface having the open center thereof comprising said fluid flow path and said jet stages each having said plurality of apertures arranged upon a substantially annular portion thereof so that particle-laden fluids pass through said apertures and impinge upon said annular surface thence through said open center to the upper surface of the immediately subjacent jet stage.

3. The apparatus of claim 1 wherein said body is substantially cylindrical.

4. A cascade impactor for determining the size distribution of particles and total particle content of particle-laden gases comprising:
   a tubular body having a gas inlet at a first end and a gas outlet at a second end thereof, and
   a plurality of particle collection stages placed within said tubular body, said collection stages each comprising a jet stage peripherally engaging the interior wall of said tubular body in a fluid sealed relationship and having a plurality of equally sized apertures therethrough and an impactor plate having a particle collection surface spaced from and positioned substantially parallel to the adjacent jet stage, at least a portion of the outer edge of said impactor plate being spaced from the interior wall of said tubular body to define a peripheral flow opening for gases past said impactor plate, the peripheral region of said particle collection surface being substantially flat without projections extending toward said inlet thereby substantially preventing impaction of particulate matter upon surfaces other than said particle collection surface, said collection stages having fluid flow cross-sectional areas in the jet stage thereof serially diminishing in the direction of flow of said particle-laden gases.

* * * * *